United States Patent [19]
Debbage et al.

[11] Patent Number: 5,762,885
[45] Date of Patent: Jun. 9, 1998

[54] APPARATUS FOR REMOVING CONTAMINANTS FROM GASEOUS STREAM.

[75] Inventors: Lawrence Debbage, Cerritos; Thomas A. Harris, Huntington Beach, both of Calif.; Eugene Kelley, Whitter, Calif.; Cary Seabaugh, Pasadena, Calif.; Robert J. MacDonald, Marina Del Ray, Calif.; Boris Reyes, Knoxville, Tenn.; Robert Danziger, Los Angeles, Calif.

[73] Assignee: Goal Line Environmental Technologies LLC, Los Angeles, Calif.

[21] Appl. No.: 801,007

[22] Filed: Feb. 19, 1997

[51] Int. Cl.⁶ ................................ B01D 50/00
[52] U.S. Cl. ............... 422/171; 422/177; 422/178; 55/223
[58] Field of Search ................... 422/171, 177, 422/178; 55/223

[56] References Cited

U.S. PATENT DOCUMENTS

| | | | |
|---|---|---|---|
| 4,153,102 | 5/1979 | Stockman | 165/8 |
| 4,418,046 | 11/1983 | Izumo et al. | 422/178 |
| 4,602,673 | 7/1986 | Michelfelder et al. | 165/7 |
| 4,739,826 | 4/1988 | Michelfelder et al. | 165/133 |
| 4,833,877 | 5/1989 | Ahland et al. | 60/39.02 |
| 4,903,755 | 2/1990 | Michelfelder et al. | 165/7 |
| 4,960,166 | 10/1990 | Hirt | 165/8 |
| 5,051,391 | 9/1991 | Tomisawa et al. | 502/242 |
| 5,237,939 | 8/1993 | Spokoyny et al. | 165/10 |
| 5,254,512 | 10/1993 | Ueda et al | 422/178 |
| 5,318,102 | 6/1994 | Spokoyny et al. | 165/10 |
| 5,323,842 | 9/1994 | Spokoyny et al. | 165/7 |
| 5,451,558 | 9/1995 | Campbell et al. | 502/325 |
| 5,603,909 | 2/1997 | Varner et al. | 423/239.1 |
| 5,607,650 | 3/1997 | Debbage et al. | 422/178 |
| 5,622,041 | 4/1997 | Feeley et al. | 60/39.02 |
| 5,665,321 | 9/1997 | Campbell et al. | 423/210 |

*Primary Examiner*—Nina Bhat
*Attorney, Agent, or Firm*—Kenneth H. Johnson

[57] ABSTRACT

An apparatus for regenerating a catalyst absorber after contact with a combustion exhaust which consist of a pair of cooperating louvered doors one on each side of a bed of catalyst absorber, there being at least two beds such that closing a cooperating pair of louvers, isolates the bed contained between the louvers from the exhaust gases while the other bed is left with the louvers open to continue treating the exhaust gas. Between each pair of louvers and associated with the catalyst absorber bed between the respective pair of louvers, there are positioned a regeneration inlet nozzle and a used regeneration gas outlet. By selectively closing various pairs of the louvers, a portion of the bed can be regenerated while the remainder of the bed continues to treat the exhaust gases. In this way an equivalent amount of active or regenerated catalyst absorber is in contact with the combustion exhaust gases to maintain a specified outlet pollution concentration limit.

11 Claims, 2 Drawing Sheets

5,762,885

APPARATUS FOR REMOVING CONTAMINANTS FROM GASEOUS STREAM.

BACKGROUND OF THE INVENTION

1. Field of the Invention

The present invention relates to apparatus and control process for operation thereof for carrying out a process for reducing gaseous pollutants in the air, namely nitrogen oxides ($NO_x$), sulfur oxides and/or carbon monoxide (CO), which are produced by combustion of hydrocarbons or hydrogen in an engine or boiler, and primarily, in a gas turbine.

2. Art Background

Turbine power plants are becoming the standard for generating electricity because they are so efficient compared to any other form of power manufacture. Turbine power plants that burn methane to produce power for residents and manufacturing facilities in cities also produce carbon monoxide and nitrogen oxide as pollutants. It is highly desirable to reduce or eliminate these pollutants so that the air is not contaminated as a result of power production.

Initially, the permitted level of pollution by power plants for nitrogen oxides ($NO_x$), which includes nitric oxide (NO) and nitrogen dioxide ($NO_2$), was less than 100 parts-per-million (ppm) and the level of carbon monoxide (CO) was to a level of less than 100 ppm. Later, a second step was taken to reduce the $NO_x$ to less than 25 ppm and the CO today is still permitted at any amount less than 100 ppm. Using current technology, the output levels of $NO_x$ can be reduced to the range of 5 to 9 ppm plus $NH_3$ slippage resulting from the selective catalytic reduction (SCR) technology described below.

Until recently the only technology which was available to obtain the 5–9 ppm $NO_x$ levels is called selective catalytic reduction, in which ammonia is mixed with flue gas and then passed over a catalyst which selectively combines the nitrogen oxides and ammonia to eliminate a major portion of the $NO_x$. One problem with the selective catalytic reduction is that as a practical matter, it is only capable of reducing the $NO_x$ to the range of 5 to 9 ppm. Another problem referred to as slippage, is caused by hazardous ammonia passing through the catalyst.

Another problem of the SCR technology is that the operating conditions required for SCR are only achieved by expensive modifications of the down stream boiler or heat exchanger system.

There have been other technologies for reduction of pollution which have been advanced, such as overwatering in the combustor, and these also have the potential to reduce the $NO_x$ pollution, but none of them reduce the $NO_x$ to levels much less than 5 to 9 ppm.

In U.S. Pat. No. 5,451,558 the oxidation and absorption steps are combined into a single step performed by a single material. Using a combined catalyst absorber, the nitrogen oxides are oxidized to nitrogen dioxide; the carbon monoxides are oxidized to carbon dioxide, and the sulfur dioxide ($SO_2$) is oxidized to sulfur trioxide ($SO_3$). This oxidation occurs at temperatures in the range of 150° to about 425° F., and more preferably in the range of 175° to 400° F., and most preferably in the range of 200° to 365° F. The space velocity of the exhaust gas may be in the range of 5,000 to 50,000 per hour ($hr^{-1}$) and more preferably in the range of 10,000 to 20,000 $hr^{-1}$, although it is anticipated that a larger range will permit effective operation without an undue reduction in quality of the output gas.

SUMMARY OF THE INVENTION

Briefly the present invention relates to an apparatus and the method for controlling the apparatus for contacting a catalyst absorber with a combustion exhaust comprising (a) at least two beds of catalyst absorber which alternately are used for absorption of pollutant gases, said beds being disposed horizontally along a vertical axis, (b) at least one first louvered door being positioned laterally along said axis adjacent to and upstream of said beds relative to the exhaust gas to prevent said exhaust gases from contacting said first bed, (c) at least one second louvered door cooperatively aligned with said first louvered door, adjacent to and downstream of said first bed relative to the exhaust gas said first and second louvered doors removing a portion of catalyst absorber from contact with the exhaust gases, (d) a source of regenerating gas for said first bed associated with said louvered doors and (e) a collection member associated with said louvered doors for recovering spent regenerating gas while preventing said spent regenerating gas from exiting with the exhaust gas. It is preferable that at the same time the first and second louvered doors are closed and blocking off the catalyst absorber for regeneration other louvered doors are opened thereby placing an equivalent amount of active or regenerated catalyst absorber into contact with the combustion exhaust gases to maintain a specified outlet pollution concentration limit.

The inlet for the regeneration gas nay be located either upstream or downstream relative to the exhaust gas flow path or positioned for lateral flow across the exhaust gas flow path. In any configuration of regeneration gas flow, the exhaust gas is blocked from the portion of the bed being regenerated.

DETAILED DESCRIPTION OF THE INVENTION

Figure 1:
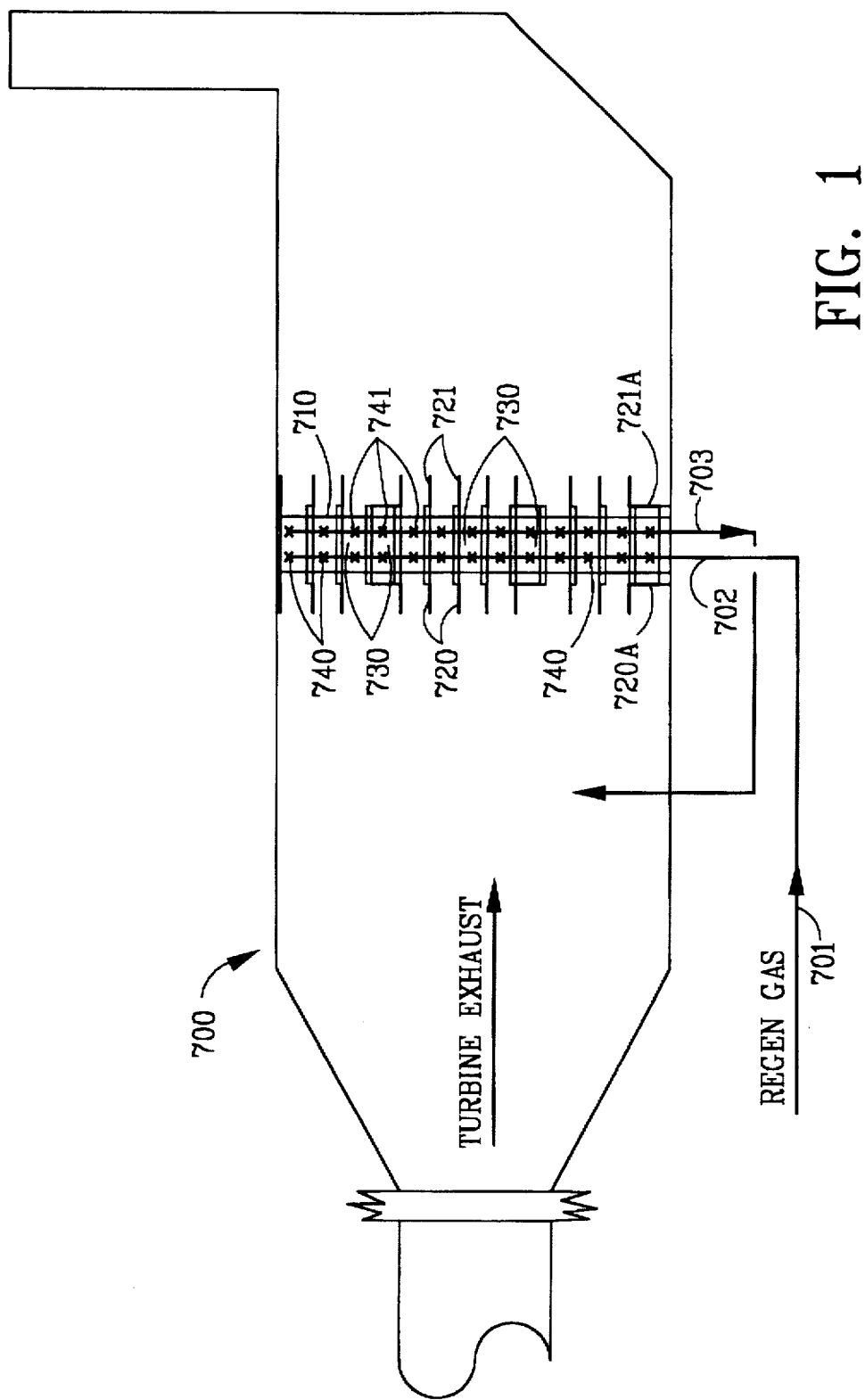
FIG. 1 is a side elevational view of one embodiment of the catalyst support in a turbine exhaust.

The pollutants from a turbine in a power generating stack are primarily present as NO. The process of the present invention causes oxidation of the NO to $NO_2$. This produces $NO_2$ from substantially all of the nitrogen oxides (NO). $NO_2$ is a much more active material and can be and is absorbed readily by the catalytic absorber from the gas stream even when present at low concentrations in the ppm range.

The turbine exhaust gases are initially at about 1000° F. after the shaft energy has been withdrawn from them. These gases are then passed over heat exchangers to remove energy and produce steam while cooling the exhaust or stack gases. Stack gases are moving at high velocity depending upon the diameter of the stack, and after heat is removed, the stack gases typically are in the range of 250° to 500° F. and travel about 30–50 feet per second. The gas contains 13–15% oxygen, up to about 12% water, and about 4% carbon dioxide. This in addition to the pollutants, which are the $NO_x$ mixed with approximately 90% NO and 10% $NO_2$, CO in the range of 30 to 200 ppm and sulfur dioxide ($SO_2$) in the range of about 0.2 to 2.0 ppm when natural gas is the fuel.

The catalyst absorber of the present invention absorbs the oxidized oxides so that only a small percentage, generally 10% or less of the initial oxide pollutants, pass through the system and are released. While not being bound to a particular theory, it is presently believed that the reactions which occur are as follows for each of the three pollutants, with an oxidation occurring, followed by a reaction with the carbonate such as $Na_2CO_3$:

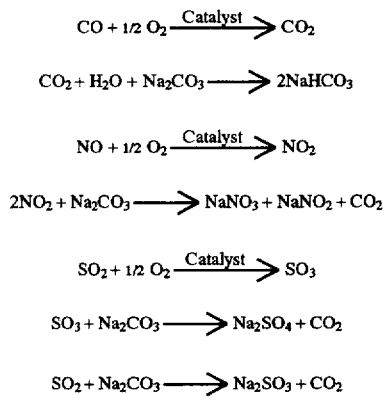

The catalyst absorber may be a platinum catalyst supported on alumina with an alkali or alkaline earth carbonate or bicarbonate coating thereon, the carbonate coating being lithium, sodium, potassium or calcium carbonate, and presently the preferred coating is a potassium carbonate.

As used herein, the term space velocity means volume units of flow per volume units of catalyst per hour.

The oxidation catalyst component is selected from the group of noble metal elements, base metal transitional elements and combinations thereof. More particularly, the oxidation catalyst components are selected from platinum, palladium, rhodium, cobalt, nickel, iron, copper and molybdenum, and preferably, platinum and rhodium, and most preferably, platinum.

The oxidation catalyst component concentration is 0.05 to 0.6 percent by weight of the material, and preferably is 0.1 of 0.4 percent by weight of the material, and most preferably is 0.15 to 0.3 percent by weight of the material. More than one element may be used as an oxidation catalyst specie, and under these conditions each of said elements has a concentration in the range of 0.05 to 0.6 percent by weight.

The high surface area support is made of alumina, zirconia, titania, silica or a combination of two or more of these oxides. Preferably, the high surface area support is made of alumina. The surface area of the support is in the range of 50 to 350 square meters per gram, preferably 100 to 325 square meters per gram, and more preferably 200 to 300 square meters per gram. The high surface area support may be coated on a ceramic or metal matrix structure.

The catalyst absorber may be in a shape such as a sphere, solid cylinder, hollow cylinder, star shape or wheel shape.

The absorber comprises at least one alkali or alkaline earth compound, which can be hydroxide compound, bicarbonate compound, or carbonate compound, or mixtures of hydroxides and/or bicarbonates and/or carbonated compounds. Preferably, the absorber comprises substantially all carbonate, and most preferably sodium carbonate, potassium carbonate or calcium carbonate. The absorber is disposed on the material at a concentration in the range of 0.5 to 20 percent by weight of the material, preferably 5.0 to 15 percent by weight of the material, and most preferably about 10% percent by weight of the material.

The catalyst absorber disclosed in U.S. Pat. No. 5,451,558, which is incorporated herein in its entirety comprises a platinum catalyst supported on alumina with an alkali or alkaline earth carbonate or bicarbonate coating thereon, the carbonate coating being lithium, sodium, potassium or calcium carbonate, and presently the preferred coating is a potassium carbonate. A preferred catalyst absorber consists of a monolith or particulate with an alumina washcoat disposed thereover, a platinum catalyst disposed on the washcoat, and with an alkali carbonate coating thereon, the carbonate coating preferably being potassium carbonate.

The catalyst absorber is preferably a material for removing gaseous pollutants from combustion exhaust comprising an oxidation catalyst specie selected from platinum, palladium, rhodium, cobalt, nickel, iron, copper, molybdenum or combinations thereof disposed on a high surface area support, said catalytic component being intimately and entirely coated with an absorber material selected from a hydroxide, carbonate, bicarbonate or mixture thereof of an alkali or alkaline earth or mixtures thereof.

The high surface area support is preferably coated on a ceramic or metal matrix structure which comprises a monolith, such as a metal monolith. The high surface area support may comprise alumina. In a preferred catalyst absorber the oxidation catalyst specie comprises Pt and said absorber material comprises carbonate. A preferred absorber consists essentially of potassium. Preferably the absorber coating is contiguous to said oxide catalyst specie. In a preferred embodiment the absorber concentration is 5.0 to 15 percent by weight of the catalyst and absorber material, more preferably the absorber concentration is about 10 percent by weight of the material.

In order to achieve the regeneration the reducing gas, such as hydrogen, must be contacted with the spent catalyst. It is contemplated that only a portion of the catalyst would need to be regenerated at one time, leaving the remainder to continue to remove the contaminants. Thus the apparatus has been adapted to divert the flue gas from a particular section of the catalyst and to direct the reducing gas thereon. Additionally, means have been provided to remove the regeneration gas separately from the flue gas exiting the catalyst section.

The present apparatus was placed just in front of the stack and downstream of the low temperature section of an existing Heat Recovery Steam Generator (HRSG). The catalyst absorber can operate in temperatures ranging from 280° to 650° F. Temperatures above 650° F. will not harm the catalyst.

Catalyst Rack

The catalyst absorber uses a wall or rack of catalyst absorber installed at approximately the 300° F. temperature range of the HRSG. The catalyst rack is arranged with twelve rows of catalyst cans. Each can holds 12 catalyst blocks—4 blocks high by 3 blocks wide by 1 block deep. Thus, each can is 24 inches high by 18 inches wide. Each catalyst row holds 7 catalyst cans for a rack width of 10½ ft. Thus the catalyst rack is approximately 24 ft. by 10½ ft. and employs a transition piece and expansion joint to expand from the 8 ft. by 22 ft HRSG dimensions to the catalyst rack size.

The catalyst absorber unit has been installed with 7 layers of blocks or cans. Total catalyst absorber depth is 3½ ft. thick. The number of layers is optional depending on the level of performance required or desired.

Regeneration System

The present apparatus comprises a system of louvers or doors that alternately close off and seal each row of the catalyst rack, front and back. Once the seal is established valves are opened at both ends of the row—one for entry of the regeneration gas in front of the row of blocks and one for exit behind the blocks. Prior to installation, full-scale flow tests were conducted on a specially constructed test rig to confirm that each of the cells in the rack were receiving regeneration gas flow. Tests on the rig were backed up by computer CFD analyses of the flow across the unit.

Regeneration gas exiting the catalyst rack is preferably collected and injected into the flue gas upstream of the catalyst absorber to allow the spent regeneration gas to be processed by the catalyst absorber.

Another important feature of the regeneration system is the fact that a positive pressure is maintained inside the catalyst rows as they are regenerated. This ensures that any seal leakage will result in regeneration gas leaking out of the cans back into the flue gas stream, rather than flue gas leaking into the cans or blocks, which would prevent complete regeneration. This redundancy has proved useful as the unit continues to perform well even in the face of known seal failures.

The regeneration gas used consists of approximately 4% hydrogen, 3% nitrogen, and 1.5% $CO_2$, with steam making up the balance. The total flow of regeneration gas is 60,000 standard cubic feet/hour. Of this, 6000 ft$^3$/hr is produced by the Surface Combustion regeneration gas unit, consisting of about 50% hydrogen, 17% $CO_2$ and 33% nitrogen. This is diluted with steam to produce the flow and constituents listed above for catalyst regeneration.

The steam use can be eliminated by recirculating the spent regeneration gas.

The regeneration gas may be produced in a two step process. First, natural gas is mixed with air and passed across a nickel partial oxidation catalyst which is electrically heated to 1900° F. A reaction occurs which produces a gas consisting of approximately 20% CO, 40% hydrogen and 40% nitrogen. This gas is then mixed with steam and passed over a shift catalyst in the second step which catalyzes a reaction between CO and steam to produce additional hydrogen and $CO_2$, resulting in the final regeneration gas composition prior to dilution with steam.

The unit uses electrical heaters for the partial oxidation catalyst, greatly simplifying installation and operation. In addition, the unit has a nitrogen recirculation pump for pre-heating the shift catalyst. This allows for a much easier start-up of the partial oxidation unit. The shift catalyst is preheated so that as soon as steam is available from the plant the regeneration unit can be easily started. Once the unit is running the nitrogen pump is turned off and heat is supplied to the shift reaction by the steam which also provides the motive force for the regeneration gas flow. This latter feature is a useful safety feature—if for any reason the steam flow is interrupted regeneration gas flow will also cease thereby preventing a buildup of hydrogen gas in the HRSG.

Control System

The heart of the control system is an Allen-Bradley Programmable Logic Loop Controller (PLC). This controller has been programmed to control all essential functions, including louver doors opening and closing, regeneration gas inlet and outlet valves opening and closing and gas flow for positive pressure maintenance.

In addition, the system is supervised by a Lab View program running on a Pentium PC. The Lab View program monitors, records and reports system performance. It sends notification and warnings when appropriate, and it allows the user to control the system by changing set points (e.g., pressures, regeneration intervals, flows). However, the PLC can operate independently of the Lab View program—a PC crash or loss of power will not interrupt system operation.

Instrumentation

The system has a full complement of gas analyzers, both upstream and downstream of the catalyst absorber unit. This includes a fully operational Continuous Emission Monitoring System (CEMS). The CEMS analyzers include an API Model 300 CO infrared analyzer and an API Model 200 $NO_x$ chemiluminescent analyzer. Additional analyzers include a Rosemont Paramagnetic $O_2$ analyzer, $CO_2$ and methane analyzers from California Analytical and a Gow-Mac hydrogen analyzer. Finally, a sample cooler from M&C cools all gas samples.

Gaseous Regeneration

Regeneration is accomplished by passing a reducing gas through the catalyst absorber. The nitrogen compounds are reacted to nitrogen gas.

Two methods of gaseous regeneration are employed depending on the temperature zone in which the catalyst absorber resides. Below 500° F. a regeneration gas generator is employed that reforms methane to a hydrogen-rich syngas. Above 500° F. methane only is needed to regenerate the catalyst thereby eliminating the need for the regeneration gas generator.

The gas regeneration occurs when a gas, free of oxygen and containing 4% hydrogen and carbon dioxide is passed through the catalyst absorber. Very low flow rates suffice (500 space velocity), thus only small amounts of regeneration gas need to be produced. No pollution results during regeneration since the reducing gases react rapidly and the spent regeneration gas is captured and recycled to reduce cost. The absorbed $NO_x$ is reacted to nitrogen and the catalyst absorber is restored to its initial activity. Any reducing gas which may leak prior to contact with the absorber will pass through active portions of the catalyst absorber and react completely. In general, the regeneration takes less than one-fourth as much time as the on stream absorption. The regeneration gas is produced outside the boiler in a dedicated regeneration gas subsystem.

Process Chemistry

The process chemistry is believed to involve oxidation of the lower oxides, CO $NO_x$ and $SO_x$ (if present) to their higher oxides thus increasing their tendency to adsorb. This combination of oxidation and sorption results in conversion of CO to $CO_2$ and the removal of $NO_x$ and $SO_x$ from the gas stream. As the reaction proceeds, the efficiency of oxidation for $NO_x$ and $SO_x$ declines resulting in reduced removal efficiencies. The efficiency of CO oxidation seems to be unaffected and continues at a high level for extended times. The efficiency of NO and $SO_2$ oxidation can be reactivated by exposing the system to a regeneration cycle.

The nature of the sorbed $NO_x$ and $SO_x$ species is not known exactly. Chemical analysis before and after the reduction cycle at about 300° F. shows residual sulfur approximately in the amount of sulfur oxide sorbed in the reaction. After reduction, however, only a small amount (<1.5%) of the $NO_x$ species sorbed remains. Gas chromatographic, mass spectrometric, infrared and ultraviolet as well as chemiluminescent analysis of the exhaust fail to account for any nitrogen species other than $N_2$. There was no detected presence of NO, $N_2O$ or HCN.

X-ray diffraction analysis of saturated samples showed no presence of crystalline nitrates, nitrites, sulfates or sulfites. When a similar saturated sample was washed with demineralized water, a solution was produced and a chemical analysis of this solution showed the presence of nitrate, nitrite, and sulfate. The distribution of nitrite and nitrate ions was approximately equimolar. There was no evidence of any sulfite species.

In the process the combustion exhaust is passed over a catalyst. The direct observation is the overall disappearance of CO, $NO_x$ and $SO_x$. Whether the CO is oxidized to $CO_2$ and sorbed is impossible to determine because the exhaust already contains 3–3.5% $CO_2$ and 10% $H_2O$. It could be possible that the $CO_2$ sorbs or passes through unabsorbed. It is also possible that reaction of CO and $H_2O$ provides the route for disappearance of CO.

In the case of $SO_x$, $SO_2$ disappears and by chemical analysis the presence of a corresponding amount of sulfur contained on the catalyst absorber has been measured.

In the case of $NO_x$, the NO, $NO_2$ and $NH_3$ have been measured. For $NO_x$ it can be concluded that oxidation of NO results in its disappearance and that in the early stages of absorption (the first 30 to 60 minutes) the $NO_2$ which would have resulted from oxidation is nearly all sorbed. At later stages of sorption (after 30 to 60 minutes) the presence of NO and $NO_2$ confirms that oxidation without absorption does take place.

The exact chemistry for the oxidation, absorption and regeneration is not known. Clearly the oxidation-absorption performed in one step is much more efficient than when the oxidation and absorption are performed sequentially. One hypothesis is that the absorber provides sites where the NO can be chemisorbed and reacted to form nitrites in addition to the sites which would be expected to chemisorb $NO_2$ and react to nitrates and nitrites. Whether the $NO_x$ is retained on the surface as NO and/or $NO_2$ is not known. It is known that nitrates and nitrites are present in the wash water when solution regeneration is used. The quantitative reaction to remove $NO_x$ and CO from rapidly moving gas makes the catalyst absorber ideally suited for pollution control.

The unit was on stream for over 60 days. Results have been extraordinary: when the unit was started the stack exhaust gas contained less pollutants than the ambient air entering the gas turbine inlet. CO levels were not detectable and $NO_x$ was measured at 0.7 ppm. Performance of the unit has remained extremely good, with CO remaining in the undetectable range and $NO_x$ remaining below 2 ppm.

Catalyst block longevity has been outstanding with over half the current catalyst load on-stream for over 10,000 hours (includes use in a different apparatus). Degradation in catalyst performance was expected, but performance of these blocks has actually improved over time. Several blocks which showed performance in the 5 to 10 ppm range in the previous apparatus are now operating continuously under 1 ppm. Mechanical systems and seals were also on-line for over 60 days.

Back pressure is a little higher than expected, but the SCPI plants are not capacity limited so there is no economic loss that results from the additional back pressure.

Figure 2:
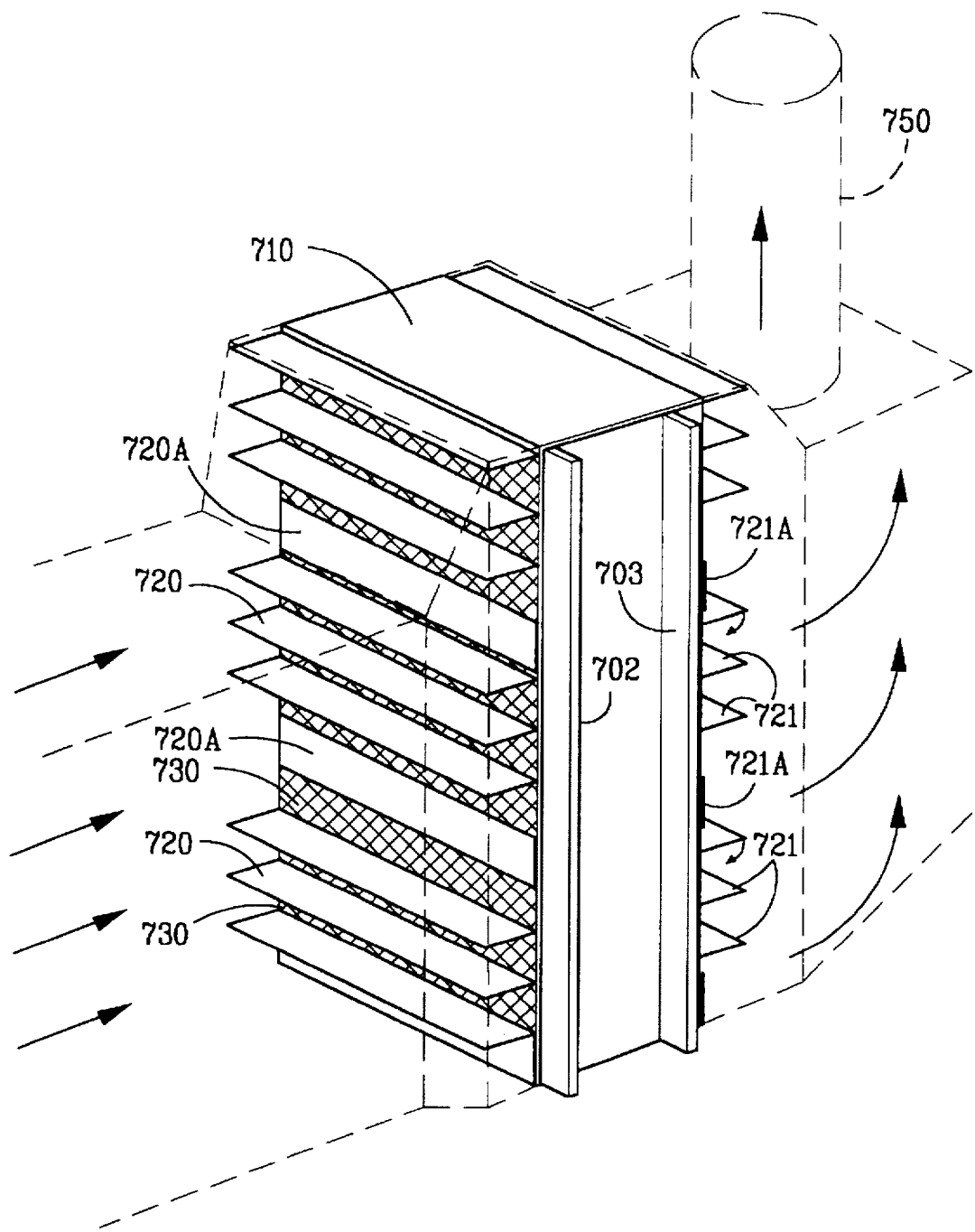
FIG. 2 is an isometric view of a frame support and catalyst regeneration mechanism.

The apparatus for regenerating the catalyst is shown in FIGS. 1 and 2. FIG. 1 generally shows the catalyst 730 in frame 710 disposed in the exhaust 700 of turbine. The front of the frame faces the exhaust gases and the back faces away from the exhaust gas source. The turbine exhaust gases pass through the frame 710 and then out the stack 750. The regeneration gas is provided by conduit 701 to header 702 which is then fed to the individual sections of the catalyst to be regenerated. The individual or discrete beds of catalyst 730 are covered by louvered doors 720 at the front and 721 at the back which preclude the exhaust gases from contacting the catalyst bed being regenerated and prevents the spent regeneration gas from exiting in the exhaust. The spent regeneration gas is removed by manifold 703 and may be recycled to the exhaust in front of the frame.

Referring now to FIG. 2 a perspective view of the frame in a turbine exhaust is shown. The manifolds 702 and 703 are shown on the side of the frame 710. The valves are built into the manifold and are controlled by the PLC which also controls the opening and closing of the louvered doors 720 and 721.

The invention claimed is:

1. An apparatus for supporting a catalyst absorber and contacting the catalyst absorber with a combustion exhaust comprising a frame supporting discrete sections of said catalyst and a moveable, louvered door over each discrete section, each of said louvered doors being independently operable to cover at least one of said discrete sections to preclude exhaust gas from contacting said discrete section.

2. The apparatus of claim 1 further comprising a second moveable louvered door over each discrete section to prevent spent regeneration gas from exiting into said exhaust.

3. An apparatus for supporting a catalyst absorber and contacting the catalyst absorber with a combustion exhaust and regenerating said catalyst absorber, comprising:

(a) a frame supporting discrete portions of said catalyst, said frame having a front facing toward said exhaust, a back facing away from said exhaust and two closed sides;

(b) a moveable louvered door covering the front and back of each of said discrete sections for independently sealing each of said discrete sections from said exhaust;

(c) a first manifold connected to each of said discrete sections to carry regeneration gas independently to each of said discrete sections; and (d) a second manifold connected to each of said discrete sections to carry spent regeneration gas independently away from each of said discrete sections.

4. The apparatus of claim 3 wherein each of said manifolds comprises valves to open for each of said discrete sections when the louvered doors for said discrete section are closed.

5. The apparatus of claim 4 wherein the operation of said valves and louvered doors is controlled by a programmable logic loop controller.

6. The apparatus of claim 3 wherein said spent regeneration gas is recycled to said exhaust in front of said frame.

7. The apparatus of claim 3 further comprising a regeneration gas generator connected to said first manifold to produce $CO_2$ and hydrogen.

8. The apparatus of claim 3 wherein said spent regeneration gas is recycled to said first manifold.

9. An apparatus for contacting a catalyst absorber with a combustion exhaust comprising (a) at least two beds of catalyst absorber which alternately are used for absorption of pollutant gases, said beds being disposed horizontally along a vertical axis, (b) at least one first louvered door being positioned laterally along said axis adjacent to and upstream of said beds relative to the exhaust gas to prevent said exhaust gases from contacting said first bed, (c) at least one second louvered door cooperatively aligned with said first louvered door, adjacent to and downstream of said first bed relative to the exhaust gas said first and second louvered doors removing a portion of catalyst absorber from contact with the exhaust gases, (d) a source of regenerating gas for said first bed associated with said louvered doors and (e) a collection member associated with said louvered doors for recovering spent regenerating gas while preventing said spent regenerating gas from exiting with the exhaust gas.

10. The apparatus of claim 9 wherein said first and second louvered doors comprise a plurality of first and second louvered doors cooperatively aligned and spaced apart by said beds.

11. The apparatus of claim 9 further comprising a frame supporting said beds of catalyst absorber.

* * * * *